US006205309B1

(12) United States Patent
Gundlach et al.

(10) Patent No.: US 6,205,309 B1
(45) Date of Patent: Mar. 20, 2001

(54) AC CORONA CHARGING ARRANGEMENT WITH CURRENT—LIMITING CAPACITOR

(75) Inventors: Robert W. Gundlach, Victor; William Mey, Rochester; Anthony C. Fornalik, Webster, all of NY (US)

(73) Assignee: Aetas Technology Corporation, Irvine, CA (US)

( * ) Notice: Subject to any disclaimer, the term of this patent is extended or adjusted under 35 U.S.C. 154(b) by 0 days.

(21) Appl. No.: 09/420,393

(22) Filed: Oct. 18, 1999

(51) Int. Cl.[7] .......................... G03G 15/02; H01G 23/00; H01T 19/04

(52) U.S. Cl. .......................... 399/170; 250/324; 361/235; 399/172

(58) Field of Search .................................... 399/170, 172, 399/173; 361/230, 235; 250/324, 326

(56) References Cited

U.S. PATENT DOCUMENTS

| | | | | |
|---|---|---|---|---|
| 2,777,957 | | 1/1957 | Walkup | 250/325 |
| 2,778,946 | | 1/1957 | Mayo | 250/325 |
| 2,965,481 | | 12/1960 | Gundlach | 250/325 X |
| 3,076,092 | | 1/1963 | Mott | 250/326 |
| 3,147,415 | | 9/1964 | Oliphant | 361/229 |
| 3,492,476 | | 1/1970 | Germanos | 250/326 |
| 4,533,230 | * | 8/1985 | Fletcher et al. | 399/172 X |
| 4,728,880 | | 3/1988 | Walgrove | 323/267 |
| 5,532,798 | * | 7/1996 | Nakagami et al. | 399/170 |
| 5,742,871 | | 4/1998 | May et al. | 399/89 |
| 5,890,035 | | 3/1999 | Kumar et al. | 399/170 X |
| 5,907,753 | | 5/1999 | Kumar et al. | 399/170 |

* cited by examiner

*Primary Examiner*—Fred L. Braun
(74) *Attorney, Agent, or Firm*—BakerBotts, LLP

(57) ABSTRACT

An AC corona charging arrangement includes a corona generating device connected through a capacitive connection to an AC voltage source and partially surrounded by a conductive shield connected to DC voltage source. In one embodiment the corona generating device is a wire having a diameter of about 50 microns and in another embodiment the corona generating device is a row of pins connected through corresponding capacitance to the AC voltage source. The presence of a capacitance between the AC voltage source and the corona generating device provides a curve representing the relationship between the current between the charging device and an adjacent conductive plate and the shield voltage which is concave downwardly, resulting in a high charging rate and greater uniformity of charging of a photoreceptor surface.

15 Claims, 1 Drawing Sheet

AC CORONA CHARGING ARRANGEMENT WITH CURRENT— LIMITING CAPACITOR

BACKGROUND OF INVENTION

This invention relates to corona charging arrangements and, more particularly, to improved AC corona charging arrangements.

The use of a corona discharge device to apply electric charges to a surface has been conventional in xerographic copiers since the inception of commercial xerography. Corona discharge devices include both small diameter wires and arrays of points which produce ions when a high voltage is applied. Originally, a DC voltage of several thousand volts was applied to a corona discharge device to ionize the adjacent air molecules, causing electric charges to be repelled from the device and attracted to an adjacent lower potential surface such as that of the photoreceptor to be charged. In the absence of control, however, such charging arrangements tend to deposit excessive and nonuniform charges on the adjacent surface.

In order to control the application of charges to the adjacent surface so as to provide a uniform charge distribution and avoid overcharging, a conductive screen has been interposed between the corona discharge device, sometimes referred to as a "coronode", and the surface to be charged. Such screened corona discharge devices are referred to as "scorotrons". Typical scorotron arrangements are described in the Walkup Pat. No. 2,777,957 and the Mayo Pat. No. 2,778,946. Early scorotrons, however, reduced the charging efficiency of the corona device to only about 3%. That is, only about three out of every one hundred ions generated at the corona wire reached the surface to be charged. They also exhibited poor control of charging uniformity and magnitude, sometimes allowing the surface to be charged to a voltage exceeding the screen potential by 100% or more. Improved scorotrons now in use usually control surface potentials to within about 3% of the reference voltage applied to the screen and operate at efficiencies of about 30% to 50% but they tend to be complex and correspondingly expensive. The Mott Pat. No. 3,076,092 discloses a DC biased AC corona/ charging arrangement which does not require a control screen.

Another corona discharge device contains a row, or two staggered rows, of pins to which a high voltage is applied to produce corona generating fields at the tips of the pins.

Because such corona discharge devices or "coronodes" ionize the oxygen and nitrogen molecules in the air, they usually generate ozone to an undesirable extent as well as nitrate compounds which tend to cause chemical corrosion. Usually, large charging devices are required to provide a high current capability while avoiding a tendency to produce arcing between the coronode wires and low voltage conductors of the charging device or the surface being charged at high charging rates.

Still another corona charging arrangement, called the "dicorotron", includes a glass-coated corona wire to which an AC voltage is applied and an adjacent DC electrode which drives charges of one polarity charge toward the photoreceptor to be charged while attracting the opposite polarity charges to itself. Dicorotrons, however, are fragile and expensive and, because of the much larger coated wire radius, require very high AC voltages (8–10 kV). They also generate high levels of ozone and nitrates and require substantial spacing of the corona wire from low voltage conducting elements and the surface to be charged in order to avoid arcing.

Negative corona emission from a conducting corona wire typically consists of concentrated points of electron emission and ionization which are randomly spaced along the corona wire. For reasons which are not yet completely understood, the spacing between these corona emission points or "hot spots" increases as relative humidity decreases which results in highly nonuniform charging of an adjacent surface. The spacing between the corona emission points also increases as the negative voltage applied to the corona wire is lowered toward the corona threshold voltage.

High quality xerographic imaging, particularly for the reproduction of images containing large areas of gray or of color in the medium range of equivalent neutral density, requires a high uniformity of charging along the length of the corona charging device with deviations in the charge per unit area applied to the adjacent surface of no more than plus or minus 3%. Scorotron charging devices of the type discussed above in which the surface potential of the photoreceptor is charged to about 2% of the final asymptote voltage within four time constants is highly desirable. Scorotrons, however, are inefficient, space consuming and are sensitive to dust collection. Moreover, the relatively low efficiency of scorotrons causes more ozone production than a more efficient charging system would generate.

SUMMARY OF THE INVENTION

Accordingly, it is an object of the present invention to provide a corona charging arrangement having improved efficiency and increased cost effectiveness compared to conventional charging arrangements.

Another object of the invention is to provide a corona charging arrangement having a reduced tendency for arc generation between a coronode and a surface to be charged or an adjacent conductive surface and limiting the energy and resulting damage in the event that arcing does occur.

A further object of the invention is to provide an AC corona charging arrangement which ensures equal generation of positive and negative corona charges.

An additional object of the invention is to provide a corona charging arrangement in which the shape of a curve representing the relation between current from the coronode to a bare plate and the voltage applied to a shield adjacent to the coronode passes near the origin and is concave downwardly to provide a sharply defined charging asymptote.

An additional object of the invention is to provide a corona charging arrangement having a reduced tendency for conveying dust and other suspended small particles into and through the corona charging unit by corona winds.

An additional object of the invention is to provide a corona charging arrangement that is remarkably insensitive to airborne toner and other debris of insulating particles.

These and other objects of the invention are attained by providing a coronode connected to a corona-generating high potential, high frequency AC power supply through a capacitor having a high voltage rating and a control shield adjacent to the coronode which is connected to a DC bias potential. Connecting the coronode to the AC power supply through a capacitor precludes high current arcs from the wire to adjacent surfaces while still permitting charge currents high enough to provide adequate charging rates for high speed printers.

In a preferred embodiment, the coronode is a wire having a diameter of about 50 microns, the peak-to-peak AC potential applied to the wire is about 5.5 kV to 7.0 kV, the capacitance of the capacitor connected between the AC power source and the corona wire is about 20 to 200 picofarads and preferably about 60 picofarads per cm length of wire and the DC potential supplied to an adjacent conductive metal shield partially surrounding the wire is in the range from about −500 to about −1,000 volts and preferably about −700 volts.

In an alternative embodiment of the invention, the coronode consists of one or more rows of pins having corona generating points, the array of pins being connected to an AC power supply through a corresponding capacitor, and a conductive shield adjacent to the row of pins and connected to a DC bias potential. With this arrangement, the plate current versus shield voltage curves are concave downwardly, assuring that the photoreceptor potential will rise faster than exponentially to the asymptote as well as beginning near the origin with a slope greater than the straight line of a simple exponential rise.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
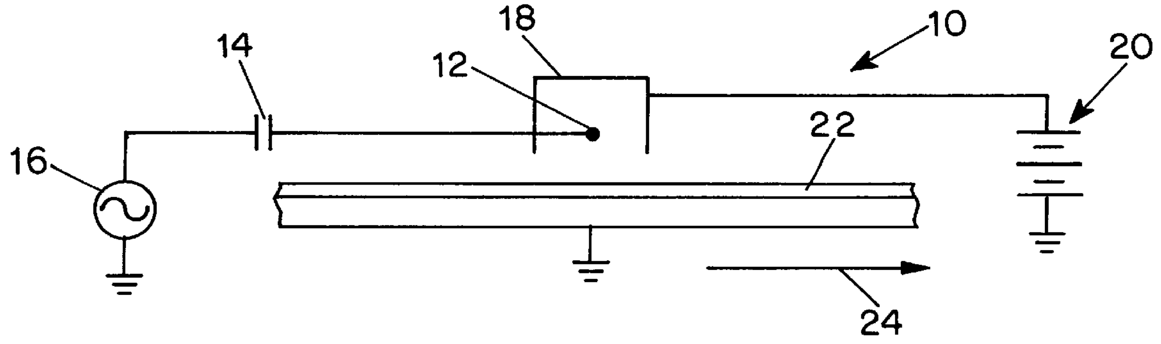
FIG. 1 is a schematic end view illustrating a representative AC corona charging arrangement in accordance with the invention utilizing a small diameter corona wire as the coronode.

In the typical embodiment of the invention shown in FIG. 1, a corona generating arrangement 10 includes a coronode which is a small diameter corona wire 12 connected through a capacitor 14 to an AC voltage source 16. A conductive channel shield 18 surrounds the corona wire 12 on three sides and is connected through a DC voltage source 20 to provide a bias potential. The corona wire 12 has a diameter in the range from about 40 microns to about 75 microns, preferably about 50 microns, and the capacitor 14 has a sufficiently high voltage rating to withstand the voltage supplied by the AC power source 16, which is preferably in the range from about 6,000 volts to about 7,000 volts peak-to-peak and desirably about 6,500 volts peak-to-peak. In accordance with the invention, the capacitor 14 has a sufficiently low capacitance to limit the current supplied to the corona wire 12 to about 3 microamperes per centimeter, which is low enough to avoid significant arcing but high enough to charge the surface of an adjacent photoreceptor 22 which is driven in the direction of the arrow 24 at a rate of about 10 centimeters per second. Preferably, the capacitance of the capacitor 14 is in the range from about 20 picofarads to about 200 picofarads, and preferably about 60 picofarads, per cm of length of the coronode. With this arrangement, the maximum current from a 2 kilohertz AC supply 16 will be about 1/2000th of 3 microcoulombs per cm per cycle or about 1.5 nanocoulombs per cm per cycle, which is effective to suppress arcing between the corona wire 12 and the shield 18 or the photoreceptor 22. Moreover, even if arcing does occur, the current limitation resulting from the capacitor 14 avoids destruction of a 50 micron corona wire.

Figure 2:
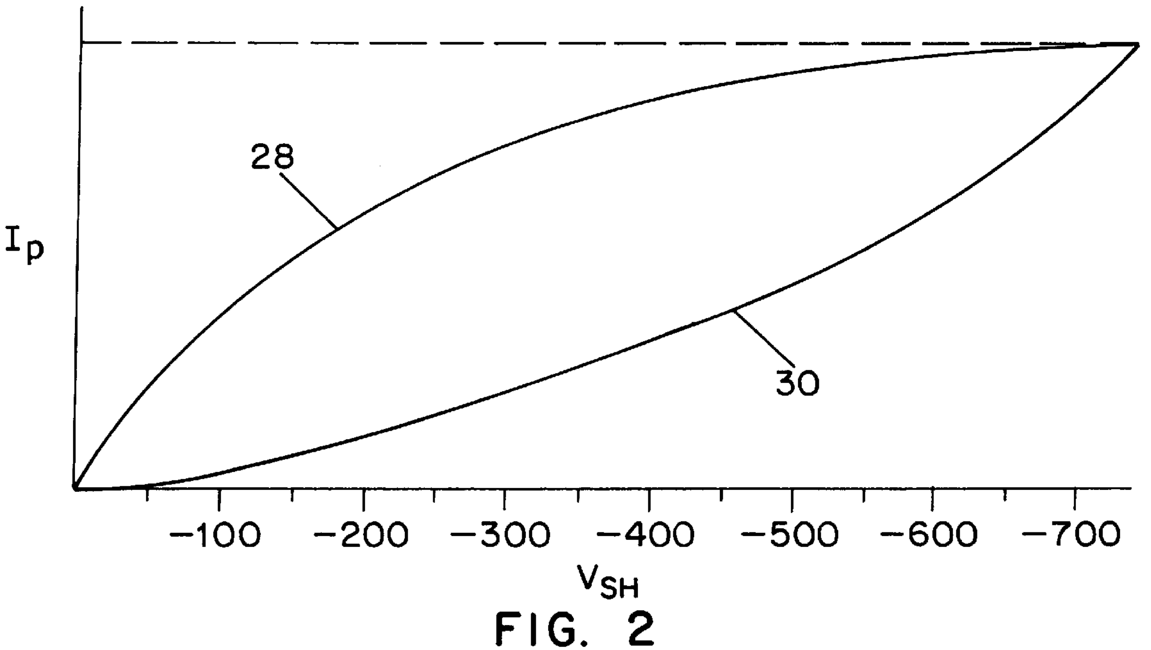
FIG. 2 is a graphical illustration showing the relation between plate current and shield voltage with an AC charging arrangement of the type shown in FIG. 1, with and without a capacitor, in which current from the corona wire to an adjacent bare plate is plotted against voltage applied to the shield.

A typical curve 28 of plate current versus shield voltage for the arrangement shown in FIG. 1 with a bare plate substituted for the photoreceptor 22 is shown in FIG. 2. The significance of base plate current measurements is described in application Ser. No. 09/420395, filed Oct. 18, 1999, the disclosure of which is incorporated by reference herein. The curve 28, which represents the relation between plate current and shield voltage at an AC voltage of 5.0 kV, is concave downwardly. This is in contrast to the upwardly concave curve 30 resulting from an arrangement omitting the capacitor and providing a direct connection between an AC voltage supply and a corona wire. The reason for the downwardly concave curvature of the curve 28 is that the coronode operates in a negative space potential between the negatively biased shield and the photoreceptor which is being charged negatively. A negative space potential around the coronode obviously increases positive corona while suppressing negative corona emissions. In fact, as the charge on the photoreceptor increases, the potential at the photoreceptor surface toward the negative reference potential on the shield, the potential around the coronode progressively becomes even more negative.

The advantage of the downwardly concave curve 28 shown in FIG. 2 for the arrangement of FIG. 1 is that the asymptote of the curve represented by the dash line is more sharply defined, since the slope of the curve is greatest at the zero current value. In addition, the plate current is higher throughout the charging process, providing greater charging efficiency which reduces ozone generation. Faster charging rates also ensure greater uniformity of the photoreceptor surface potential reached within the required charging time. Typically, the charge on the photoreceptor will reach 98% of its asymptotic value in less than four time constants. This is in contrast to the typical plate current versus shield voltage curve 30 for a system without any capacitor between the AC power source 16 and the corona wire 12 which, because of its lower initial current values, requires a longer charging time at a given AC coronode voltage.

In addition, with an AC charging arrangement of the type shown in FIG. 1, the corona winds are minimal, thereby reducing introduction of toner dust and other suspended small particles into the charging unit and deposition of unwanted debris onto the surfaces of the charging unit, including both the wire 12 and the shield 18. Not only are corona winds minimal under AC corona since the force driving ions reverses twice every cycle (4,000 times/sec for an AC freq of 2 kHz), but toner and other airborne debris that might be deposited on the shield surfaces have little adverse effect.

This is because, with a given asymptote potential applied to the shield 18 and only equal quantities of positive and negative ions being generated from the capacitively connected coronode 12, once the photoreceptor reaches the asymptote potential of the shield, there is no reason for toner or dust on the shield to acquire any net charges. Initially, the DC fields between the shield and photoreceptor will drive negative ions to the photoreceptor and positive ions to the shield. As the photoreceptor reaches its asymptote value, the fields between the shield and photoreceptor collapse, and no further charging of the photoreceptor or of insulating toner or dust on the shield will occur.

In contrast, for DC corona charging, ions of the coronode polarity will be driven to the powder-coated shield or to a scorotron grid, substantially raising the potential of the powder toward that of the coronode. The result is that the effective voltage of the grid of a scorotron rises to a value well above that applied to the conducting grid, itself.

For similar small particles of toner or other debris collecting on the coronode wire, with high frequency AC voltages applied to the wire, fields above the corona threshold will create a plasma of electrons and ions alternately at the AC frequency applied. During the negative cycle, the particles of toner outside of the plasma region (about 8 to 20 $\mu$m or more from the surface of the wire) will acquire negative charges and be strongly repelled from the wire. Any particles within the plasma region will be charged oppositely to the wire potential. As soon as the AC fields reverse polarity (1/4000th second later, for 2 kHz AC), those charged particles will be driven explosively away from the surface of the coronode. That sudden explosive "puff" of powder is observed when AC corona voltage is applied to a coronode that had been manually coated with toner. Consequently, charging with a coronode capacitively coupled to an AC power source significantly reduces problems caused by toner or airborne debris in the charging unit in conventional charging arrangements.

Figure 3:
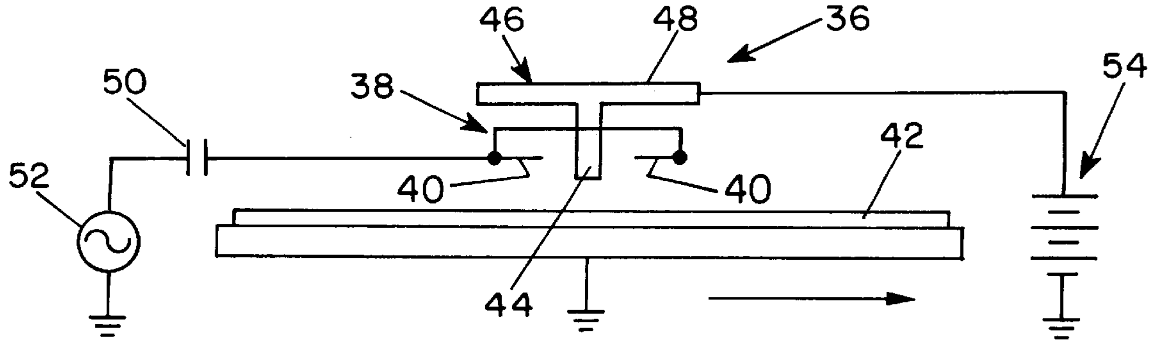
FIG. 3 is a schematic side view showing a further representative embodiment of the invention utilizing a coronode containing corona generating pins.

In the alternative embodiment of the invention shown in FIG. 3, a corona generating arrangement 36 includes a coronode 38 having corona generating pins 40 disposed in an array extending across the width of the surface of a photoreceptor 42 to be charged. In the illustrated embodiment, two rows of pins 40 face opposite sides of a vertical wall 44 of a T-shaped shield 46 which includes an upper horizontal wall 48 extending over both rows of pins 40. The pins 40 are connected through a capacitor 50 to an AC power source 52 having the same characteristics as the power source 16 in FIG. 1 and the shield 46 is connected to a DC bias voltage source 54. The capacitive connection 50 between the corona generating elements of this arrangement and the power source provides the same advantages as does the capacitive connection between the AC power source 16 and the corona wire 12 of FIG. 1.

It has been found that providing a single capacitor for all of the pins provides essentially the same result as providing a separate capacitor for each of the pins. A primary function of the capacitor seems to be to ensure equal negative and positive corona ionization, which prevents a flattening of the current versus voltage curve 28 shown in FIG. 2 at the low voltage end and imposes a finite limitation on ionization that results in flattening the current-voltage curve at the high voltage end where ions are not generated at the same increasing rate so that the ion sweep out rate closes in on the ion generation rate. While there is no need to provide a separate capacitor for each pin, since each pin array has considerable capacitance compared to a wire coronode, if smaller capacitors are desired, one capacitor may be provided for each row of pins or one capacitor can be provided for every ten or fifteen pins.

Although the invention has been described herein with reference to specific embodiments, many modifications and variations therein will readily occur to those skilled in the art. Accordingly, all such variations and modifications are included within the intended scope of the invention.

What is claimed is:

1. An AC corona charging arrangement comprising:

corona generating means;

an AC voltage source;

current-limiting capacitance means connecting the AC voltage source to the corona generating means through a floating connection to apply AC voltage to the corona generating means while limiting the current supplied to the corona generating means sufficiently to inhibit arcing; a conductive shield partially surrounding the corona generating means; and a DC bias voltage source connected to the shield.

2. An AC corona charging arrangement according to claim 1 wherein the corona generating means comprises a corona wire.

3. An AC charging arrangement according to claim 2 wherein the corona wire has a diameter in the range from about 40 microns to about 75 microns.

4. An AC charging arrangement according to claim 3 wherein the corona wire has a diameter of about 50 microns.

5. An AC corona charging arrangement according to claim 1 wherein the corona generating means is elongated in a direction parallel to a surface to be charged and capacitance means provides a capacitance in the range from about 20 picofarads to about 200 picofarads per centimeter of length of the corona generating means in the direction of elongation.

6. An AC corona charging arrangement in accordance with claim 5 wherein the capacitance means provides a capacitance of about 60 picofarads per centimeter.

7. An AC corona charging, arrangement according to claim 1 wherein the DC voltage source provides a DC bias voltage in the range from about −500 to about −1,000 volts to the shield.

8. An AC corona charging arrangement according to claim 7 wherein the DC voltage source provides a negative DC voltage of about 750 volts to the shield.

9. An AC corona charging arrangement according to claim 1 wherein the AC voltage source supplies a voltage of about 4,000 to 7,000 volts peak-to-peak AC voltage to the corona generating means.

10. An AC corona charging arrangement according to claim 1 wherein the relation between the current produced between the corona generating means and an adjacent bare plate and the voltage applied to the shield is a curve which is concave downwardly.

11. An AC corona charging arrangement according to claim 1 wherein the relation between the current produced between the corona generating means and an adjacent bare plate and the voltage applied to the shield is a curve which passes near the origin.

12. An AC corona charging arrangement according to claim 1 wherein the corona generating means comprises a plurality of pins and the capacitive means comprises a plurality of capacitors each connecting at least one of the pins to the AC voltage source.

13. An AC corona charging arrangement according to claim 12 wherein the plurality of capacitors comprises one capacitor for each group of pins consisting of about 10 to about 15 pins.

14. An AC corona charging arrangement according to claim 1 wherein the corona generating means comprises a plurality of pins and the capacitive means comprises a single capacitor connecting all of the pins to the AC voltage source.

15. An AC corona charging arrangement according to claim 1 wherein the conductive shield comprises a T-shaped conductive member and the corona generating means comprises two pluralities of pins disposed on opposite sides of a vertical portion of the T-shaped conductive member.

* * * * *